United States Patent [19]

Helmer et al.

[11] Patent Number: 4,711,805
[45] Date of Patent: Dec. 8, 1987

[54] PROCESS FOR TREATING THE SURFACE OF A TRANSPARENT SHEET OR FILM HAVING ANTILACERATION AND SELF-HEALING PROPERTIES AND THE PRODUCT MADE THEREBY

[75] Inventors: Rädisch Helmer, Aachen; Esser Günther, Herzogenrath, both of Fed. Rep. of Germany

[73] Assignee: Saint-Gobain Vitrage, Aubervilliers, France

[21] Appl. No.: 624,284

[22] Filed: Jun. 25, 1984

[30] Foreign Application Priority Data

Jul. 4, 1983 [FR] France ............... 83 11056

[51] Int. Cl.⁴ .............. B32B 5/16; B32B 17/10; B32B 27/40; B05D 5/06
[52] U.S. Cl. .................. 428/323; 427/163; 427/164; 427/387; 428/329; 428/330; 428/331; 428/423.1; 428/423.3; 428/425.5; 428/425.6; 428/484
[58] Field of Search ............ 427/167, 387, 416, 163, 427/164; 428/425.5, 425.6, 323, 329, 330, 331, 423.1, 423.3, 484

[56] References Cited

U.S. PATENT DOCUMENTS 3,971,864 7/1976 Beestrice et al. ............ 428/38

OTHER PUBLICATIONS

"A Guide to Dow Corning Products", Midland, Michigan, Dow Corning Corporation, 1977, pp. 27–28.
Hawley, G. G., "The Condensed Chemical Dictionary", New York, Van Nostrand Reinhold Company, 1977, pp. 596, 810.

Primary Examiner—Evan K. Lawrence
Attorney, Agent, or Firm—Oblon, Fisher, Spivak, McClelland & Maier

[57] ABSTRACT

A process for the treatment of the surface of a transparent sheet or film having antilacerative and self-healing properties and the product made thereby, wherein the sheet or film includes a thermosetting polyurethane material employed as an external layer on a laminated glass or laminated plastic sheet or a mixture thereof. The process involves depositing a solution, dispersion or emulsion of wax or a wax-like substance and a silicone oil; or a solution, dispersion or emulsion of wax or a wax-like substance, a silicone oil and a fine-grained polishing agent on the surface of the polyurethane material. The solvent or solvents for the wax or wax-like substances have a boiling range of 40° to 300° C., and the silicone oil is present in an amount of less than 4% by wt. when no polishing agents are present and in an amount of from about 2 to 10% by wt. when fine-grained polishing agents are present. The product made by the process has been rendered particularly resistant to scratching and abrasion without formation of striations on the surface.

12 Claims, No Drawings

PROCESS FOR TREATING THE SURFACE OF A TRANSPARENT SHEET OR FILM HAVING ANTILACERATION AND SELF-HEALING PROPERTIES AND THE PRODUCT MADE THEREBY

BACKGROUND OF THE INVENTION

1. Field of the Invention:

The present invention relates to the treatment of the thermosetting polyurethane surface of a sheet or film having antilaceration and self-healing properties, with the sheet or film, having and exposed transparent sheet or film of thermosetting polyurethane, being employed as an external layer on a laminated glass sheet or laminated plastic sheet. Further, the surface to be treated has deposited thereon a solution or emulsion of wax containing a silicone oil. Also included in the present invention is a sheet or film treated by the process of the invention.

2. Description of the Prior Art:

The terminology "sheet or film having antilaceration properties" refers to a sheet or film which, in the case of breakage of a glass pane, resists laceration and covers the sharp edges of the glass fragments, thereby protecting the vehicle occupants from cuts and injuries. The terminology "sheet or film having self-healing properties" refers to a sheet or film which is self-occluding, whereby accidental chafes, scratches or local compressive indentations on the surface of the sheet or film quickly and automatically disappear. In other words, the sheet or film is scatch-resistant and abrasion-resistant.

When a transparent polyurethane sheet or film is employed to cover a glass sheet, it automatically serves to protect against lacerations and it is desired that it be scratch resistant.

U.S. Pat. No. 3,971,864 describes the use of a wax layer to coat a sheet or film of thermoplastic polyurethane having antilaceration properties and covering a sheet of silicate glass, wherewith following the coating process the wax layer is polished. The substrate to which this treatment is applied comprises, e.g., a polyurethane sheet or film having antilaceration properties described in U.S. Pat. No. 3,808,077. These thermoplastic polyurethanes are produced from low molecular weight components which over a period of time diffuse toward the free surface of the antilaceration layer where they form a grayish white precipitate or deposit. The treatment of the surface with a wax prevents or impedes the formation of this detrimental precipitate, or if the precipitate has already formed then the treatment causes it to disappear.

The wax-based polishes employed according to this patent comprise aliphatic hydrocarbons as solvents for the wax or wax-like substance, and further comprise various amounts of silicone oils as glossing agents.

It is difficult to obtain a wax layer free from (and unsusceptible to) striae and other optical perturbations. Furthermore, it is well-known that after a non-uniform film is formed, optical defects in it cannot be completely eliminated even by repeated mechanical polishing. At most, they may only be relieved.

Moreover, when the wax solution or dispersion described in U.S. Pat. No. 3,971,864 is applied to a thermosetting sheet or film of polyurethane having antilaceration properties (such as the sheets or films described in French Pat. No. 2,251,608), new problems are created; in particular, the surface of the polyurethane sheet or film is streaked by the wax solution.

Hence, a need clearly continues to exist for a treatment for the surface of a sheet or film having antilaceration properties, where the sheet or film essentially entails a transparent polyurethane material, which does not impair the optical properties of the safety glass with which the treated film is employed.

SUMMARY OF THE INVENTION

Accordingly, it is an object of the present invention to provide a treatment for the polyurethane surface of a sheet or film having antilaceration properties, where the sheet or film essentially entails a transparent polyurethane material, which does not impart the optical properties of the safety glass with which the treated film is employed.

More particularly, it is an object of this invention to provide a treatment for the surface of such a sheet or film whereby the antilacerative sheet or film does not become striated.

It is also an object of the present invention to provide a transparent sheet or film which has been surface treated according to the process of the present invention to provide a sheet or film having antilaceration properties without surface striations which affect the optical properties of the transparent film or sheet.

According to the present invention, the foregoing and other objects are attained by providing a process for the treatment of the thermosetting polyurethane surface of a transparent sheet or film having antilacerative and self-healing properties, wherein the sheet or film entails a polyurethane material employed as an external layer on a laminated glass or laminated plastic sheet or a mixture thereof, which process involves depositing a solution, dispersion or emulsion of wax or a wax-like substance and a silicone oil; or a solution, dispersion or emulsion of wax or a wax-like substance, a silicone oil and a fine-grained polishing agent on the surface to be treated; wherein the solutions, dispersions or emulsions of wax contain a solvent or solvents for the wax or wax-like substances which boil within the range of 40 to 300° C., and wherein the solutions, dispersions or emulsions have silicone oil in an amount of less than 4% by wt. when no polishing agents are present and in an amount of from about 2 to 10% by wt. when the solutions, dispersions or emulsions contain the fine-grained polishing agents, and allowing the deposited solution, dispersion or emulsion to dry.

DESCRIPTION OF THE PREFERRED EMBODIMENTS

According to the present invention, it is now possible to treat the surface of a transparent sheet or film having antilaceration properties, such as one made of a polyurethane material, to render the sheet or film particularly resistant to scratching and abrasive impressions without causing striations to form on the surface of the transparent sheet or film.

In particular, the treatment of the present invention is particularly suitable for the treatment of thermosetting polymers such as the thermosetting polyurethanes, which up until now have been plagued by the formation of striations on the surface thereof as a consequence of such surface treatments.

According to the invention, the film is treated by depositing a solution, dispersion, or emulsion of wax on its surface, containing one or more solvents for the wax or wax-like substances, which solvents boil within the range 40 to 300° C., and (said solution, dispersion, or emulsion) further containing a silicone oil in an amount less than 4 wt. % when solid polishing agents are not present and in an amount from 2 to 10 wt. % when solid polishing agents are present, the content of said polishing agents being from 2 to 30 wt. %; with said deposition possibly followed by polishing of the deposited wax layer.

The solvent or solvents for the wax are preferably hydrocarbons.

The wax dispersions are comprised of dispersing agents in the amount of 0.5 to 2 wt. %.

By using as the solvent only petroleum spirits, which can include purified gasoline fractions, boiling at 300° C. maximum, the aforementioned disadvantages are avoided and a wax layer is obtained which is free from perturbations or defects. At the same time, by reducing the amount of silicone to 4 wt. % maximum when polishing agents are not present and 10 wt. % maximum when one or more polishing agents are employed, the deleterious effects of silicone oil are eliminated.

The solution, emulsion, or dispersion of wax may be applied by any known technique. Spraying techniques which enable uniform application have proven especially satisfactory. The composition of the wax formulation may be adjusted to suit the application technique chosen.

In principle, any wax formulation suited to the purpose of the invention may in addition contain adjuvants, e.g., antioxidants and anti-U.V. stabilizers.

It is also possible to employ so-called self-polishing wax formulations which require little or no additional polishing. These are applied, e.g., by a spraying technique.

A particular advantage of the invention is that the addition of the wax layer reduces the coefficient of friction of the polyurethane sheet or film. Consequently said sheet or film is less susceptible to surface damage such as surface impressions, compressive indentation, chafes, and scratches. In particular, for a sheet or film of a plastic material having self-healing properties, which sheet or film when deformed experienced exclusively elastic deformation (plastic deformation being negligible), the wax layer may play a crucial role in scratch resistance, particularly resistance to abrasive impressions, because it is known from German Pat. No. 2,058,504 that in such cases the coefficient of friction of the surface is an important factor.

The invention is particularly advantageous for treating surfaces of sheets or films of polyurethane materials with three-dimensional crosslinkage which sheets or films have antilaceration and self-healing properties. Such polyurethanes are produced, e.q., by reacting the following compounds: a bifunctional isocyanate such as 1,6-hexanediisocyanate, trimethyl-1,6-hexanediisocyanate, m-xylenediisocyanate, 4,4'-methylenebis(cyclohexaneisocyanate), isophoronediisocyanate or a biuret having three or more isocyanate groups (and derived from isophoronediisocyanate), or an isocyanurate or an isocyanurate derivative; one of the preceding group of compounds to be reacted with one of the following group of compounds: a polyfunctional polyol such as a branched polyol (e.g., a polyester polyol or a polyether polyol produced by reaction of a polyfunctional alcohol such as glycerin, 1,5-dihydroxy-3-hydroxymethylpentane, hexanetriol, pentaerythritol, sorbitol, or a derivative of the preceding, with an aliphatic dicarboxylic acid such as adipic acid or with a cyclic ether such as epoxyethane, epoxypropane, or tetrahydrofuran). The molecular weight of the branched polyol is generally between 250 and 4000, and preferably between 450 and 2000.

The invention is preferably applied for treating surfaces of sheets or films produced by mixing the following components:

Component (1): A polyether polyol having free OH groups in the amount of 10.5 to 12 wt. %, which is the product resulting from the condensation of epoxypropane with 1,5-dihydroxy-3-hydroxymethylpentane;

Component (2): A biuret of 1,6-hexanediisocyanate, having free isocyanate groups in the amount of 21 to 25 wt. %; and Component (3): An organotin compound employed as a catalyst.

The ratio of Component (3) to Component (1) is less than 0.001 by wt., and that of Component (1) to Component (2) is between 0.9 and 1.1 by wt. It has been shown that application of the inventive treatment to polyurethane sheets or films of the type described in French Pat. No. 2,251,608 and French Pat. No. 2,398,606 enables good self-healing properties to be attained, as measured in standard tests, which are retained after long intervals and under widely varying climatic conditions.

Suitable waxes according to the invention include fossil mineral waxes and their derivatives, lignite wax and derivatives, peat wax, vegetable waxes (such as palm wax and carnauba wax), waxes from herbs and bushes (such a condelilla wax and cotton wax), waxes from fruits (such as Japan wax), waxes from gramineous plants (such as sugar cane wax), waxes from insect products (such as beeswax), paraffins, ozokerite, polyethylene and other synthetic waxes, and oxazoline waxes (i.e., waxes containing an oxazoline moiety).

One may employ as the silicone oil, in particular, oils having a viscosity between 100 and 5000 centipoise and preferably between 300 and 5000 cp. Particularly, suitable oils are a methylsilicone oil, a phenylsilicone oil, products modified with amino groups or a mixture thereof.

One may advantageously employ as the solvent aliphatic or aromatic hydrocarbons boiling at temperatures within the range 100 to 200° C. Chlorinated hydrocarbons may also be used, e.g., (in special cases) 1,1,1-trichloroethane or tetrachloroethene. These (i.e., chlorinated) solvents are particularly suitable when, e.g., the wax layer is applied under heating.

The use of fine-grained polishing agents, if opted for, must not adversely affect the optical quality of the surface of the polyurethane. Accordingly, particular polishing agents which are candidates for use have diameters between about 0.1 and 2 microns, and preferably comprise polishing aluminas, natural chalks or chalks prepared by precipitation, metal silicates, alkaline earth silicates, or a mixture thereof.

The inventive treatment may be carried out on a sheet or film before the sheet or film is combined with the support in the manufacture of laminated glass. Preferably, the treatment is carried out with the sheet or film already in place and in final form on the support.

The present invention will be further illustrated by certain examples and references which are provided for purposes of illustration only and are not intended to limit the present invention.

EXAMPLE 1

A sheet or film of polyurethane with three-dimensional crosslinkage and having properties of antilaceration and self-healing is prepared by reacting the following components:

- 1000 g of a polyether of m.w. around 450, obtained by condensation of epoxypropane with 2,2-bis(hydroxymethyl)-1-butanol and having a content of free OH groups of about 10.5 to 12 wt. %;
- 10 g of the sebacate of bis (1,2,2,6,6-pentamethyl-4-piperidyl);
- 5 g dibutyltin dilaurate; and
- 1000 g of a biuret of 1,6-hexanediisocyanate, having a content of free NCO groups of 21 to 25 wt. %.

The components are mixed and the mixture is degassed by agitation under reduced pressure, to avoid bubble or blister formation in the polyurethane sheet or film.

The homogeneous mixture thus prepared is flow-molded on a plane support with the aid of, e.g., a molding head with scraper, whereby a layer about 0.5 mm thick is formed. If the layer is polymerized by, e.g., the action of heat, a layer of adhesive is flow-molded onto the resulting initial polyurethane layer, said adhesive comprising essentially a thermoplastic linear polyurethane, which adhesive may be prepared by reacting isocyanates on a polyester under a nitrogen atmosphere, wherewith the polyester is prepared in a reactor at 180° C. from 145 parts by wt. adipic acid, 50 parts sebacic acid, 145 parts ε-caprolactone, 120 parts 2,2-dimethyl-1,3-propanediol, and 80 parts 1,4-butanediol, the preceding components being reacted in the presence of 25 parts xylene and 0.25 parts dibutyltin dilaurate. After separating out 22.5 parts water from the reaction mixture, 18 parts 1,4-butanediol and 400 parts xylene are added as a chain lengthening measure. The temperature is then lowered to 80° C. and 150 parts bis(4-isocyanatocyclohexyl)methane and 50 parts 3-isocyanatomethyl-3,5,5-trimethylcyclohexylisocyanate are added under vigorous agitation.

The temperature is then increased to 100° C. and the polymerization is continued until a thermoplastic polyurethane is obtained with molecular weight of at least 40,000 and preferably above 50,000. After cooling to about 70° C. the mixture is diluted with c. 3000 parts methyl ethyl ketone, and then with 3000 parts tetrahydrofuran after cooling to c. 30° C., whereby a solution is obtained which is about 10 wt. % polyurethane.

The said solution is flow-molded with the aid of a flow-molding head with scraper onto a previously prepared sheet or film of thermosetting polyurethane with three-dimensional crosslinkage. After the solvent evaporates, the thickness of the layer of adhesive is about 0.4 mm.

The two-layered plastic sheet thus obtained is then separated from the mold support. By action of temperature and pressure, the sheet is combined with a monolithic or laminated glass support or a plastic plate or sheet.

After the sheet having antilaceration and self-healing properties is thus applied to the support, a polish formulation of the following composition is applied uniformly to the free surface of the thermosetting polyurethane, in the amount of 15 g polish formulation per 1 m² of surface:

- 3.5 wt. % carnauba wax having viscosity of 300 mPa;
- 1.5 wt. % methylsilicone oil having viscosity 1000 mPa;
- 50 wt. % aliphatic hydrocarbons boiling within the range 100 to 400° C.; and
- 44.7 wt. % aliphatic hydrocarbons boiling within the range 140 to 200° C.

After evaporation of the solvents, the wax layer is polished by steady rubbing with a soft textile material. In this way a very uniform wax layer is obtained.

The coefficient of friction is measured by a method conforming to DIN 53375 or ASTM D 1894-75. Whereas most likely the coefficient of friction of the polyurethane surface was 0.7 to 0.9 prior to treatment with the wax, it is lowered by the treatment to between 0.3 and 0.5. Correspondingly, the scratch resistance as measured with an Erichsen apparatus is increased from a value between 25 and 30 p to a value between 40 and 55 p. The treated sheet or film shows a similarly large increase in abrasion resistance.

EXAMPLE 2

A laminated glass sheet is prepared comprising two sheets of silicate glass with an intermediate layer of polyvinylbutyral 0.76 mm thick, said laminated glass sheet intended to be used as a windshield for a motor vehicle. An antilacerating layer such as described in Example 1 is pressed onto the surface of the laminated glass sheet which surface faces the passenger compartment of the vehicle.

After this antilaceration layer has been applied, a wax dispersion formulation with the following composition is applied uniformly over the surface, in the amount of 10 g/m² (percent figures given are in wt. %):

- 7.5% derivatives of lignite wax;
- 3.0% of a methylsilicone oil having viscosity 300 mPa;
- 0.4% of a mathylsilicone oil having viscosity 1000 mPa;
- 0.5% of a nonionic emulsifier;
- 0.3% of an anionic emulsifier;
- 10.0% polishing alumina;
- 18.0% hydrocarbons boiling within the range 100° to 200° C.; and
- the complement of water to make 100%.

When this coating has dried, the wax layer is polished. The coefficient of friction of the antilaceration layer is lowered to the same degree by this treatment as was the case in Example 1.

EXAMPLE 3

A sheet having antilaceration properties is prepared as in Example 1, and is applied to a safety glass window comprised of a simple sheet of tempered silicate glass. The combination of the antilaceration sheet and glass sheet is passed between a pair of rubber rolls, to provide temporary adhesion. Final adhesion of the sheet having antilaceration properties to the glass sheet is achieved in an autoclave at increased temperatures and pressures.

After this antilaceration layer has been affixed to the glass, a wax solution with the following composition is applied over the antilaceration layer (percent figures given are in wt. %):

- 3.5% candelilla wax;
- 3.5% of a methylsilicone oil having viscosity 300 mPa;
- 0.5% of a methylsilicone oil having viscosity 1000 mPa;

40.0% hydrocarbons boiling within the range 100° to 140° C.; and 52.5% trimethylbenzene.

The wax solution is sprayed on the antilaceration layer under heating, e.g., to 80° C., wherewith the glass sheet supporting the antilaceration layer may be preheated to between 50° and 80° C. By this preheating measure, the time required to achieve evaporation of the solvent is substantially reduced, whereby the wax layer may be polished shortly after it is applied. This treatment enables the coefficient of friction to be lowered to the same degree as in the previous Examples.

EXAMPLE 4

A glass sheet furnished with an antilaceration coating is prepared as described in one of the preceding Examples. A wax dispersion formulation with the following composition is applied over the antilaceration layer (percent figures given are in wt. %):

6% of a derivative of lignite wax;

2% of a paraffin wax;

8.5% of a methylsilicone oil having viscosity 300 mPa;

0.7% of a methylsilicone oil having viscosity 1000 mPa;

0.5% of a nonionic emulsifier;

0.3% of an anionic emulsifier;

30% polishing alumina;

20% hydrocarbons boiling within the range 100° to 250° C.; and

32% water.

The formulation is applied by means of a spray gun. After evaporation of the solvent, the wax layer is polished.

EXAMPLE 5

A glass sheet furnished with an antilaceration coating is prepared as described in one of the preceding Examples. A wax dispersion formulation with the following composition is applied over the antilaceration layer (percent figures given are in wt. %):

1% of an oxazoline wax (i.e., a wax containing an oxazoline moiety);

2% of a paraffin wax;

3% of a derivative of lignite wax;

1% of a cationic emulsifier;

20% hydrocarbons boiling within the range 100° to 200° C.;

15% hydrocarbons boiling within the range 100° to 250° C.;

2.5% of a methylsilicone oil having viscosity 300 mPa;

0.5% of a methylsilicone oil having viscosity 1000 mPa; and 55.0% water.

After evaporation of the water and solvent, the wax layer is polished with a soft cloth.

Having now fully described this invention, it will be apparent to one of ordinary skill in the art that many changes and modifications can be made thereto without departing from the spirit or scope of the invention as set forth herein.

What is claimed as new and is intended to be secured by Letter Patent is:

1. A process for the treatment of the thermosetting polyurethane surface of a transparent sheet or film having antilacerative and self-healing properties, wherein said sheet or film comprises a thermosetting polyurethane material obtained by the reaction of a polyether polyol having free OH groups in the amount of 10.5 to 12 wt. % with a biuret of 1,6-hexanediisocyanate, wherein said polyether polyol is prepared by the reaction of epoxypropane with 1,5-dihydroxy-3-hydroxymethylpentane, and wherein said diisocyanate contains about 21 to 25 wt. % of isocyanate groups, and further wherein the ratio of the polyether polyol component to the diisocyanate component in the reaction mixture is 0.9 to 1.1 by weight said sheet or film with the polyurethane surface exposed being employed as an external layer on a laminated glass or laminated plastic sheet, which process comprises depositing a solution, dispersion or emulsion of wax or a wax-like substance and a silicone oil; or a solution, dispersion or emulsion of wax or a wax-like substance, a silicone oil and a fine-grained polishing agent on the polyurethane surface to be treated wherein said solutions, dispersions or emulsions of wax comprise a solvent or solvents for said wax or wax-like substances which boil within the range of 40° to 300° C., and wherein said solutions, dispersions or emulsions have silicone oil in an amount of less than 4% by wt. when no polishing agents are present and in an amount of from about 2 to about 10% by wt. when said solutions, dispersions or emulsions contain said fine-grained polishing agents, and allowing the deposited solution, dispersion or emulsion to dry.

2. The process according to claim 1, wherein said wax or wax-like substances is selected from the group consisting of fossil mineral waxes and derivates thereof, lignite wax and derivatives thereof, peat wax, vegetable wax, waxes from herbs and bushes, waxes from fruits, waxes from gramineous plants, waxes from insect products, paraffins, ozokerite, polyethylene and oxazoline containing waxes.

3. The process according to claim 1, wherein said solvent or solvents are aliphatic or aromatic hydrocarbons or a mixture thereof.

4. The process according to claim 3, wherein said hydrocarbons have a boiling range of about 100° to 200° C.

5. The process according to claim 1, wherein said silicone oil has a viscosity in the range of 300 to 5000 mPa.

6. The process according to claim 5, wherein said silicone oil is selected from the group consisting of a methylsilicone oil, a phenylsilicone oil and a mixture thereof.

7. The process according to claim 1, wherein said fine-grained polishing agents have a particle size between about 0.1 and 2 microns.

8. The process accordint to claim 7, wherein said fine-grained polishing agents are polishing aluminas, natural chalks or chalks prepared by precipitation, metal silicates, alkaline earth silicates or a mixture thereof.

9. The process according to claim 8, wherein said wax dispersions comprise water.

10. The process according to claim 1, wherein said wax dispersions are comprised of dispersing agents in the amount of 0.5 to 2 wt. %.

11. The process according to claim 1, wherein said treatment in carried out on said sheet or film which has been combined with a support of glass to form a laminated glass sheet.

12. A transparent sheet or film which has been treated by the process according to claim 1.

* * * * *